United States Patent [19]

Sakuramoto et al.

[11] Patent Number: 4,797,251

[45] Date of Patent: Jan. 10, 1989

[54] PROCESS FOR FIXING METAL POWDER MOLDING AT SINTERING

[75] Inventors: Takahumi Sakuramoto; Eishi Asoshina; Takashi Tominaga; Ichiro Ijichi; Kiyohiro Kamei; Toshiharu Konishi, all of Osaka, Japan

[73] Assignee: Nitto Electric Industrial Co., Ltd., Osaka, Japan

[21] Appl. No.: 939,298

[22] Filed: Dec. 5, 1986

Related U.S. Application Data

[63] Continuation of Ser. No. 728,538, Apr. 29, 1985, abandoned.

[30] Foreign Application Priority Data

Apr. 29, 1984 [JP] Japan ................................ 59-87313
Apr. 29, 1984 [JP] Japan ................................ 59-87314
Apr. 29, 1984 [JP] Japan ................................ 59-87315

[51] Int. Cl.$^4$ ............................................. B22F 7/04
[52] U.S. Cl. ........................................... 419/9; 419/54
[58] Field of Search ............... 428/551, 557, 560, 564; 75/230; 525/57; 419/9, 53, 54

[56] References Cited

U.S. PATENT DOCUMENTS

| | | | |
|---|---|---|---|
| 3,449,094 | 6/1969 | Baxt et al. | 428/551 |
| 3,935,173 | 1/1976 | Ogasawara et al. | 260/78.5 E |
| 4,248,978 | 2/1981 | de Cleur et al. | 525/124 |
| 4,293,476 | 10/1981 | Moore et al. | 260/29.7 W |
| 4,391,855 | 7/1983 | Geeck | 427/383.7 |
| 4,396,666 | 8/1983 | Ernsberger | 428/208 |
| 4,514,546 | 4/1985 | Resz et al. | 525/57 |
| 4,554,301 | 11/1985 | Dohi et al. | 524/210 |
| 4,563,329 | 1/1986 | Morishita et al. | 419/9 |
| 4,596,692 | 6/1986 | Morishita et al. | 419/9 |
| 4,596,746 | 6/1986 | Morishita et al. | 419/9 |
| 4,608,225 | 8/1986 | Sakuramoto et al. | 419/5 |

FOREIGN PATENT DOCUMENTS 1548226 7/1979 United Kingdom .

*Primary Examiner*—John F. Terapane
*Assistant Examiner*—Eric Jorgensen
*Attorney, Agent, or Firm*—Sughrue, Mion, Zinn, Macpeak & Seas

[57] ABSTRACT

A composition for fixing metal powder molding at sintering, which is used, in the case of disposing a metal powder molding formed by rolling a mixture of a metal powder and a synthetic resin-based binder on a metal base material and sintering the metal powder molding in a non-oxidizing atmosphere, the adhere and fix the metal powder molding onto the base material until the metal powder molding is sintered by interposing between the metal powder molding and the base material, comprising a thermosetting resin composition containing a mixture of a thermosetting resin and at least one member selected from the group consisting of a metal fine powder, a thermoplastic resin and an adhesive material, wherein the amount of the residual carbon of the composition after completion of sintering is at least about 0.5% by weight.

12 Claims, No Drawings

PROCESS FOR FIXING METAL POWDER MOLDING AT SINTERING

This is a continuation of application Ser. No. 728,538 filed Apr. 29, 1985, now abandoned.

FIELD OF THE INVENTION

This invention relates to a fixing composition at sintering which is used in the case of forming a metal layer on the surface of a metal base material for improving the abrasion resistance of the base material surface by disposing a sheet-like material or an analogous article thereof formed by rolling a mixture of the metal powder and a synthetic resin-based binder on the metal base material followed by sintering.

BACKGROUND OF THE INVENTION

When a metal powder sheet formed by rolling a mixture of the metal powder and a binder is placed on a metal base material and sintered for forming the metal layer thereon, the binder in the metal powder sheet, even if the binder has originally an adhesive action, is burned and volatilized off in the temperature raising stage for sintering to lose the adhesive function, whereby the adhesion between the metal powder sheet and the base material is lost. Thus, when the weight of the metal powder sheet acts on the adhesion face with the base material as the case of bonding the metal powder sheet to a slanting surface or a curved surface of the base material or a downward surface of the base material, the adhesive force of the binder cannot support the weight of the metal powder sheet, whereby the metal powder sheet peels off or falls from the base material. In particular, in the case of performing the sintering treatment of the metal powder sheet, which suffers vibration or impact during conveying in a furnace such as a mesh-belt type or pusher type continuous sintering furnace, a vacuum sintering furnace, etc., the metal powder sheet tends to peel off or fall due to the vibration or impact.

As an effective method for overcoming the above-described problem, the inventors already proposed a method of preventing the occurrence of peeling off or falling of the metal powder sheet even in the case of bonding the sheet to a metal base material in the specific state as described above and performing the sintering treatment as applying vibration or impact to the metal powder sheet by interposing a specific composition between the metal powder sheet and the metal base material in the case of disposing the sheet on the base material to assist the adhesion or fixing of the sheet to the base material until the metal powder sheet is sintered (Japanese Patent Application No. 34887/84, corresponding to U.S. patent application Ser. No. 705,264, filed Feb. 25, 1985).

However, since the composition used in the previously proposed method is mainly composed of a (meth-)acrylic acid alkyl ester polymer, a specific sintering operation that the sintering system is maintained at 250° to 380° C. for a definite period of time in the initial stage of temperature raising is required and the desired effect cannot be attained without employing such a specific operation. Such a sintering operation is not always practical and is somewhat lacking in general industrial utilization.

SUMMARY OF THE INVENTION

As a result of various investigations from the above-described viewpoints, the inventors have succeeded to attain the present invention.

Accordingly, an object of this invention is to provide a composition for fixing metal powder molding at sintering, which is used, in the case of disposing a metal powder molding formed by rolling a mixture of a metal powder and a synthetic resin-based binder on a metal base material and sintering the metal powder molding in a non-oxidizing atmosphere, to adhere and fix the metal powder molding onto the base material until the metal powder molding is sintered by interposing between the metal powder molding and the base material, comprising a thermosetting resin composition containing a mixture of a thermosetting resin and at least one member selected from the group consisting of a metal fine powder, a thermoplastic resin and an adhesive material, wherein the amount of the residual carbon of the composition after completion of sintering is at least about 0.5% by weight.

DETAILED DESCRIPTION OF THE INVENTION

When the composition of this invention is interposed between a metal powder molding and a metal base material and the metal powder molding is subjected to a sintering treatment by a constant temperature raising rate, after first hardening the thermosetting resin in the initial treatment raising stage of from about 120° to 250° C., a strong adhesive force caused thereby assists the adhesion and fixing of the metal powder molding onto the base material, and further in the subsequent temperature raising stage, gaseous thermal decomposition products are released to form a carbon precursor, which exhibits the function of assisting the adhesion and fixing of the molding onto the base material in a temperature range of usually about 700° C. at which the metal powder molding begins to be sintered.

The metal fine powder contained in the composition has the function to suppress the rapid lowering of the viscosity during the molten stage prior to the hardening of the thermosetting resin, by the dispersion of the powder, and provides a good effect to maintain the adhesion force of the molding on the surface of the base material at this stage. The metal fine powder also has the function of lowering the initiating temperature of sintering at the base material interface by the mutual action with the molding, and this is useful to maintain the adhesive force of the molding.

Therefore, even when the metal powder molding is placed on a slanting surface or a curved surface of the base material or is stuck up to the downward surface of the base material, and the metal powder molding disposed on the base material is subjected to a sintering treatment in a state of applying vibration or impact to the molding during conveying in a sintering furnace, the use of the composition of this invention does not cause the problems of peeling off or falling of the metal powder molding during the sintering treatment.

Thus, by interposing the fixing composition of this invention between the metal power molding and a metal base material, a desired metal layer strongly fixed on the metal base material by bonding of the metals each other of the base metal material and the metal powder can be formed on the base material without the specific sintering operation as required in the previous proposal, i.e., by applying a conventional sintering treatment which employs a constant temperature raising rate, without the problem of peeling off or falling of the metal powder molding during the sintering treatment and substantially without the occurrence of the shrinkage of the metal powder molding in the plane directions during the sintering treatment.

The most representative example of the thermosetting resin which can be used in this invention is an epoxy resin. Examples of the epoxy resin are a bisphenol A type epoxy resin having an epoxy equivalent of from about 100 to 5,000, an ether ester type epoxy resin, a novolak type epoxy resin, an ester type epoxy resin, an alicyclic type epoxy resin, a glycidyl ether type epoxy resin containing nitrogen, etc. Of those epoxy resins, a bisphenol A type epoxy resin is preferred.

As a hardening agent for an epoxy resin, a heat activative hardening agent which exhibits a hardening action by heating is used. In general, a hardening agent which is active in the temperature range of from about 80° to 200° C. is sufficiently used. Examples of the hardening agent which can be used are dicyandiamide, imidazoles, hydrazide compounds, urea derivatives, etc. The amount of the hardening agent is usually from about 1 to 15 parts by weight per 100 parts by weight of the epoxy resin.

As the thermosetting resin which can be used in this invention, thermosetting resins other than the above-described epoxy resins, such as phenol resins and unsaturated polyester resins can be also used. In this case, hardening agents may be selected according to the type of the thermosetting resin used. Also, a polyurethane resin comprising polyisocyanate and polyol as the constitutional materials may be used as the thermosetting resin. As the constitutional materials, modified materials such as acryl-modified polyisocyanate and an acryl-modified polyol may be used.

The metal fine powder used in combination with the thermosetting resin is a metal fine powder of iron, nickel, cobalt, copper, chromium, silver, etc. Of those powders, the powders having a low sintering temperature is preferred. The metal fine powder has a particle size of about 10 $\mu$m or less, preferably from 0.1 to 1 $\mu$m.

The amount of the metal fine powder used is from about 0.5 to 100 parts by weight, preferably from 1 to 30 parts by weight, per 100 parts by weight of the thermosetting resin. If the amount thereof is too small, the desired effect described above cannot be obtained, and if the amount thereof is too large, the adhesion of the molding is not maintained.

In this invention, use of at least one of the metal fine powder, thermoplastic resin and adhesive material can additionally provide the following good effect.

Those components have the function of further suppressing the rapid decrease of viscosity during the melting stage prior to the hardening of the thermosetting resin. Further, the adhesion maintaining force of the molding can be further increased by the adhesive strength of the adhesive material.

Examples of the thermoplastic resin are a high molecular weight epoxy resin derived from bisphenol A and epichlorohydrin, a polyamide resin, an ethylenevinyl acetate copolymer, a polyvinyl butyral, a polyester resin, a polysulfone, polyketone, a butane-acrylonitrile copolymer, etc. Of those resins, the high molecular weight epoxy resin, polyester resin, polyamide resin and ethylene-vinyl acetate copolymer are preferred.

As the adhesive material, a rubber-based or acryl-based adhesive polymer which is conventionally used in the adhesive composition or the polymer containing a tackifier can be used. Of those polymers, an adhesive comprising a (meth)acrylic alkyl ester-based polymer is preferred.

The preferred examples of the adhesive are an acrylic copolymer comprising from about 80 to 99.5% by weight of an alkyl ester of (meth)acrylic acid having from 2 to 12 average carbon atoms in the alkyl moiety and from about 0.5 to 2% by weight of a copolymerizable monomer having a functional group in the molecule such as (meth)acrylic acid, maleic acid, 2-hydroxy (meth)acrylic acie, glycidyl (meth)acrylate, N-methylol (meth)acrylamide, N,N-dimethylaminoethyl (meth)acrylate, etc., and a mixture comprising 100 parts by weight of the acrylic copolymer and from about 0.1 to 100 parts by weight of an adhesive property imparting resin such as an alkylphenol resin, a coumarone-indene resin, a polyterpene resin, a rosin resin, a petroleum resin, a polyvinyl ether resin, etc.

The amount of the thermosetting resin and/or adhesive material used is from about 2 to 200 parts by weight, preferably 10 to 50 parts by weight, per 100 parts by weight of the thermosetting resin. If the amount thereof is too small, the effect by the use thereof cannot be obtained, and if the amount thereof is too large, a strong adhesive force by the hardening of the thermosetting resin cannot be expected.

The fixing composition of this invention may further contain, if desired and necessary, a conventional hardening agent; a hardening accelerator; a xylene resin, paraffin wax, process oil, abietyl alcohol, etc., as a softening agent; calcium carbonate, silica, talc, etc., as a filler; dioctyl phthalate, dioctyl adipate, triphenyl phosphate, dibutyl phthalate, etc., as a plasticizer; etc.

It is important in this invention that when the above-described composition composed of such constitutional components is interposed between a metal powder molding and a metal base material and the sintering treatment is performed, the amount of residual carbon after the completion of sintering is at least about 0.5% by weight, whereby the effect of this invention can be obtained. In other words, when the amount of residual carbon is less than about 0.5% by weight, the improvement of the adhesive and fixing force of the metal powder molding in high temperature heating cannot be obtained.

The establishment of the above-described amount of residual carbon can be easily made by properly selecting the type of the thermosetting resin or the types of the thermosetting resin and a hardening agent, or further by properly selecting the types and amounts of the thermosetting resin, adhesive material and additives. It is particularly preferred that the amount of residual carbon is in the range of from about 1.0 to 10% by weight.

It is desirable that the fixing composition of this invention has a pressure-sensitive adhesive property by using the adhesive material, but it is not an inevitable factor in this invention. In this case, by applying, if necessary, a heat energy to the composition when interposing the composition between the metal powder molding and the metal base material, the temporary adhesion of the composition can be easily practiced.

Then, the method of using the fixed composition at sintering of this invention is explained. First, in the case of disposing a metal powder molding formed by rolling a mixture of a metal powder and a synthetic resin-based binder on a metal base material, the fixing composition of this invention is interposed between the metal base material and the metal powder molding. The interposition of the composition may be performed by previously forming a sheet of the composition or by coating at least one of the base material and the molding with the composition.

The thickness of the sheet of the composition or the coating thickness of the composition is generally from about 5 to 50 μm, preferably about 10 to 30 μm. If the thickness is too thin, the effect of this invention is not obtained and if the thickness is too thick, the generation of gas at the interface between the base material and the molding becomes severe to reduce the fixing strength at sintering and the bonding strength after sintering.

The metal powder molding used in the above method is formed by rolling a mixture of a metal powder and a synthetic resin-based binder into a sheet-like material or an analogous article thereof. In the case of using the composition as a sheet, the thickness of the sheet is usually from about 0.5 to 5 mm.

As the above-described metal powder, various metal powders such as a self-melting alloy powder and an abrasion resisting alloy powder can be used according to the property to be imparted to the surface of the metal base material. The representative example of the alloy powder is an Fe-M-C system eutectic alloy powder which is an abrasion resisting alloy powder, wherein M contains at least one of Mo, B and P as the main component. Furthermore, M may further contain Cr, V, W, Nb, Ta or Ti as a secondary element and may contain other elements such as Si, Ni, Mn, etc. Such an eutectic alloy powder has the feature that the sintering temperature is relatively low, the liquid phase becomes generally from about 10 to 50% by volume in the temperature range of from about 1,000° to 1,150° C., and the liquid phase has an excellent wetting property for the metal base material.

In addition, it is preferred that the particle size of the alloy powder be generally about 150 Tyler mesh or less in view of the fact that the particle size influences on the porosity after sintering. If the particle size is larger than the above value, it is difficult to form an alloy layer having a high density.

As the synthetic resin-based binder to be mixed with the above-described metal powder, a binder having a pressure-sensitive adhesive property is preferred. In particular, an acrylic polymer or copolymer composed of a (meth)acrylic alkyl ester or composed of the ester and a monomer copolymerizable therewith and an acrylic pressure-sensitive adhesive composition composed of the acrylic polymer or copolymer containing added thereto an adhesive property imparting resin such as an alkylphenolic resin, a rosin resin, a petroleum resin, a cumarone-indene resin, etc., are preferably used.

The above-described synthetic resin-based binder is diluted with a proper organic solvent such as acetone, toluene, methyl ethyl ketone, etc., the solution is kneaded with from about 10 to 100 parts by weight of the metal powder per 1 part by weight of the solid component thereof, the kneaded mixture is poured on a frame having thereon a mold release paper and after evaporating the solvent, the mixture is molded into a sheet form or the like by passing it through molding rolls to provide a desired metal powder molding.

The metal powder molding is placed on a metal base material with the fixing composition of this invention interposed between them as described above and is sintered in a non-oxidizing atmosphere. In this case, the temperature raising rate may be constant and it is unnecessary to maintain the system at a lower temperature side for a definite period of time at sintering as the previous proposal. In the initial temperature raising stage, the thermosetting resin in the composition is first hardened to show a strong adhesive force and then converted into a carbon precursor which effectively contributes to the adhesion, the carbon precursor further contributing to stably adhere and fix the molding onto the base material until the temperature reaches the sintering temperature. Further, in this case, the metal fine powder in the composition prevents the lowering of the adhesive force during the melting stage prior to the hardening of the thermosetting resin and also lowers the initiating temperature of the sintering, thereby providing a good effect to the adhesion maintaining force.

The reason why the sintering processing is carried out under a non-oxidizing atmosphere is apparent. Namely, a desired alloy layer cannot be formed in an oxidizing atmosphere, because the molding is oxidized to cause deterioration during the processing. The non-oxidizing atmosphere includes not only hydrogen gas atmosphere and nitrogen gas atmosphere but also vacuum, etc.

When the temperature of the system is increased to the sintering temperature as described above and then the system is maintained at the sintering temperature for a definite period of time, the carbon precursor is finally completely carbonized. In this caes, the amount of residual carbon is at least about 0.5% by weight as described above. Also, similar materials in the metal powder molding are carbonized and vanished. On the other hand, the metal component in the molding diffuses in the base material to form a metal layer strongly bonded to the base material.

The invention is described in more detail by reference to the following examples. Unless otherwise indicated, all parts and percentages are by weight.

EXAMPLE 1

70 parts of a bisphenol A type liquid epoxy resin (epoxy equivalent: 184 to 194), 30 parts of a bisphenol A type solid epoxy resin (epoxy equivalent: 600 to 700), and 70 parts of acetone were mixed, and 5 parts of dicyandiamide, 5 parts of iron powder having an average particle size of 1 μm or less, and 2 parts of dichlorophenyldimethylurea were further added thereto to form a solution as a fixing composition of this invention. The solution was coated on a mold release paper and dried to form a sheet having a thickness of 30 μm. The amount of residual carbon when the sheet was subjected to a carbonization treatment under the same condition as the subsequent sintering treatment was 7%.

On the other hand, after wet-kneading 58.8% of an eutectic alloy powder composed of 10.5% Mo, 2.5% Cr, 2.4% P and 3.6% C, rest being Fe and having a particle size of 150 Tyler mesh or less, 39.2% of a SUS 410 powder having a particle size of 150 Tyler mesh or less and further 2% of (meth)acrylic acid alkyl ester resin using acetone as a solvent, the kneaded mixture was rolled to form an alloy powder sheet having a thickness of 1 mm and a density of 4.65 g/cm$^3$.

The sheet thus formed was cut into a size of 1 cm × 1 cm and after sticking the above sheet of the fixing composition cut into the same size to the alloy powder sheet, the sheet was stuck to a vertical surface of a steel base material. Thereafter, the temperature of the system was increased to 1,080° C. at a rate of 15°/min. in a hydrogen gas atmosphere and after maintaining the system at the temperature for 15 minutes, the system was gradually cooled.

Thus, an abrasion resisting alloy layer having a thickness of 0.8 to 0.82 mm, a hardness of 61 to 63 in HRC, and a density of 7.6 to 7.7 g/cm$^3$ and strongly bonded to the steel base material could be formed without causing falling of the metal powder sheet during the sintering treatment.

EXAMPLE 2

| | |
|---|---|
| Bisphenol A type liquid epoxy resin (epoxy equivalent: 184 to 194) | 80 parts |
| High molecular weight epoxy resin (molecular weight: 50,000–70,000) | 20 parts |
| Iron powder having a particle size of 1 μm or less | 50 parts |
| Dicyandiamine | 5 parts |
| Acetone | 100 parts |

A fixing composition of this invention was formed by mixing the above-described components in the same manner as in Example 1 and coated on a mold release paper and dried to form a sheet having a thickness of 15 μm. The amount of residual carbon when the sheet was subjected to a carbonization treatment under the same condition as the subsequent sintering treatment was 7.5%.

On the other hand, after wet-kneading 48.5% of the eutectic alloy powder as used in Example 1, 48.5% of a SUS 410 powder having a particle size of 150 Tyler mesh or less, and 3% of a (meth)acrylic acid alkyl ester using toluene as a solvent, the kneaded mixture was rolled to provide an alloy powder sheet having a thickness of 2 mm and a density of 4.8 g/cm$^3$.

The sheet thus formed was cut into a size of 1 cm × 1 cm and after sticking the above sheet of the fixing composition cut into the same size to the alloy powder sheet, the sheet was stuck to a vertical surface of a metal base material. Thereafter, the temperature of the system was increased to 1,090° C. at a rate of 15° C./min. in a hydrogen gas atmosphere, and after maintaining the system at the temperature, the system was gradually cooled.

Thus, an abrasion resisting alloy layer having a thickness of 1.6 to 1.65 mm, a hardness of 62 to 65 in HRC, and a density of 7.6 to 7.75 g/cm$^3$ and strongly bonded to the steel base material could be formed without causing falling of the alloy powder metal during the sintering treatment.

EXAMPLE 3

| | |
|---|---|
| Bisphenol A type liquid epoxy resin (epoxy equivalent: 184 to 194) | 75 parts |
| Bisphenol A type solid epoxy resin (epoxy equivalent: 600 to 700) | 25 parts |
| Acetone | 60 parts |
| Dicyandiamide | 5 parts |
| Ni powder having an average particle size of 1 μm or less | 10 parts |
| Dichlorophenyldimethylurea | 2 parts |

A fixing composition of this invention was formed by mixing the above-described components in the same manner as in Example 1 and coated on a mold release paper and dried to form a sheet having a thickness of 20 μm. The amount of residual carbon when the sheet was subjected to a carbonization treatment under the same condition as the subsequent sintering treatment was 7%.

On the other hand, after wet-kneading 38.6% of the eutectic alloy powder as used in Example 1, 57.9% of a SUS 410 powder having a particle size of 150 Tyler mesh or less, and 3.5% of a (meth)acrylic acid alkyl ester using toluene as a solvent, the kneaded mixture was rolled to provide an alloy powder sheet having a thickness of 1.5 mm and a density of 4.8 g/cm$^3$.

The sheet thus formed was cut into a size of 1 cm × 1 cm and after sticking the above sheet of the fixing composition cut into the same size to the alloy powder sheet, the sheet was stuck to a vertical surface of a metal base material. Thereafter, the temperature of the system was increased to 1,100° C. at a rate of 20° C./min. in a hydrogen gas atmosphere, and after maintaining the system at the temperature, the system was gradually cooled.

Thus, an abrasion ressiting alloy layer having a thickness of 1.3 to 1.35 mm, a hardness of 60 to 62 in HRC, and a density of 7.5 to 7.7 g/cm$^3$ and strongly bonded to the steel base material could be formed without causing falling of the alloy powder metal during the sintering treatment.

EXAMPLE 4

| | |
|---|---|
| Bishenol A type liquid epoxy resin (epoxy equivalent: 184 to 194) | 70 parts |
| Bisphenol A type solid epoxy resin (epoxy equivalent: 600 to 700) | 10 parts |
| Thermoplastic polyester resin (specific gravity: 1.2, molecular weight: 20,000–25,000) | 20 parts |
| Dicyandiamide | 5 parts |

A fixing composition of this invention was formed by mixing the above-described components and press molded to form a sheet having a thickness of 15 μm. The amount of residual carbon when the sheet was subjected to a carbonization treatment under the same condition as the subsequent sintering treatment was 6.6%.

On the other hand, after wet-kneading 58.8% of the eutectic alloy powder as used in Example 1, 39.2% of a SUS 410 powder having a particle size of 150 Tyler mesh or less, and 2% of a (meth)acrylic acid alkyl ester using toluene as a solvent, the kneaded mixture was rolled to provide an alloy powder sheet having a thickness of 1 mm and a density of 4.65 g/cm$^3$.

The sheet thus formed was cut into a size of 1 cm × 1 cm and after sticking the above sheet of the fixing composition cut into the same size to the alloy powder sheet, the sheet was stuck to a vertical surface of a metal base material. Thereafter, the temperature of the system was increased to 1,080° C. at a rate of 15° C./min. in a hydrogen gas atmosphere, and after maintaining the system at the temperature, the system was gradually cooled.

Thus, an abrasion resisting alloy layer having a thickness of 0.8 to 0.82 mm, a hardness of 61 to 63 in HRC, and a density of 7.6 to 7.7 g/cm$^3$ and strongly bonded to the steel base material could be formed without causing falling of the alloy powder metal during the sintering treatment.

EXAMPLE 5

| | |
|---|---|
| Bisphenol A type liquid epoxy resin (epoxy equivalent: 184 to 194) | 65 parts |
| Polyamide copolymer resin (softening point: 70-80° C.) | 35 parts |
| Dicyandiamide | 5 parts |
| Dichlorophenyldimethylurea | 1 part |

A mixing composition of this invention was formed by mixing the above-described components and press molded to form a sheet having a thickness of 25 μm. The amount of residual carbon when the sheet was subjected to a carbonization treatment under the same condition as the subsequent sintering treatment was 6.2%.

On the other hand, after wet-kneading 38.6% of the eutectic alloy powder as used in Example 1, 57.9% of a SUS 410 powder having a particle size of 150 Tyler mesh or less, and 3.5% of a (meth)acrylic acid alkyl ester using toluene as a solvent, the kneaded mixture was rolled to provide an alloy powder sheet having a thickness of 1.5 mm and a density of 4.8 g/cm$^3$.

The sheet thus formed was cut into a size of 1 cm×1 cm and after sticking the above sheet of the fixing composition cut into the same size to the alloy powder sheet, the sheet was stuck to a vertical surface of a metal base material. Thereafter, the temperature of the system was increased to 1,100° C. at a rate of 10° C./min. in a hydrogen gas atmosphere, and after maintaining the system at the temperature, the system was gradually cooled.

Thus, an abrasion resisting alloy layer having a thickness of 1.3 to 1.35 mm, a hardness of 60 to 62 in HRC, and a density of 7.5 to 7.7 g/cm$^3$ and strongly bonded to the steel base material could be formed without causing falling of the alloy powder metal during the sintering treatment.

EXAMPLE 6

| | |
|---|---|
| Isooctyl acrylate | 97.9 parts |
| Glycidyl methacrylate | 0.1 part |
| Acrylic acid | 2 parts |
| Toluene | 120 parts |
| Benzoyl peroxide | 0.2 part |

The above components were charged into a reactor and polymerized at 75° C. for 8 hours to obtain a solution containing an acrylic copolymer having a weight average molecular weight of 500,000. A fixing composition of this invention was formed by mixing 100 parts of the solution thus obtained with a mixed solution of 20 parts of a bisphenol A type liquid epoxy resin (epoxy equivalent: 184–194), 7 parts of a bisphenol A type solid epoxy resin (epoxy equivalent: 600–700), 50 parts of acetone, 1.5 parts of dicyandiamide and 0.5 part of dichlorophenyldimethylurea and coated on a mold release paper and dried to form a sheet having a thickness of 20 μm. The amount of residual carbon when the sheet was subjected to a carbonization treatment under the same condition as the subsequent sintering treatment was 3%.

On the other hand, after wet-kneading 38.6% of the eutectic alloy powder as used in Example 1, 57.9% of a SUS 410 powder having a particle size of 150 Tyler mesh or less, and 3.5% of a (meth)acrylic acid alkyl ester using acetone as a solvent, the kneaded mixture was rolled to provide an alloy powder sheet having a thickness of 1.5 mm and a density of 4.8 g/cm$^3$.

The sheet thus formed was cut into a size of 1 cm×1 cm and after sticking the above sheet of the fixing composition cut into the same size to the alloy powder sheet, the sheet was stuck to a vertical surface of a metal base material. Thereafter, the temperature of the system was increased to 1,100° C. at a rate of 10° C./min. in a hydrogen gas atmosphere, and after maintaining the system at the temperature, the system was gradually cooled.

Thus, an abrasion resisting alloy layer having a thickness of 1.3 to 1.35 mm, a hardness of 60 to 62 in HRC, and a density of 7.5 to 7.7 g/cm$^3$ and strongly bonded to the steel base material could be formed without causing falling of the alloy powder metal during the sintering treatment.

EXAMPLE 7

| | |
|---|---|
| Bisphenol A type liquid epoxy resin (epoxy equivalent: 184 to 194) | 70 parts |
| Bisphenol A type solid epoxy resin (epoxy equivalent: 600 to 700) | 30 parts |
| Isoprene rubber | 100 parts |
| Terpene-phenol resin (number average molecular weight: 1,000-2,000) | 90 parts |
| Dicyandiamide | 5 parts |
| Dichlorophenyldimethylurea | 2 parts |
| Anti-aging agent | 3 parts |
| Acetone | 50 parts |

A fixing composition of this invention was formed by mixing the above-described components and coated on a mold release paper and dried to form a sheet having a thickness of 25 μm. The amount of residual carbon when the sheet was subjected to a carbonization treatment under the same condition as the subsequent sintering treatment was 3%.

On the other hand, after wet-kneading 58.8% of the eutectic alloy powder as used in Example 1, 39.2% of a SUS 410 powder having a particle size of 150 Tyler mesh or less, and 2% of a (meth)acrylic acid alkyl ester using toluene as a solvent, the kneaded mixture was rolled to provide an alloy powder sheet having a thickness of 1 mm and a density of 4.65 g/cm$^3$.

The sheet thus formed was cut into a size of 1 cm×1 cm and after sticking the above sheet of the fixing composition cut into the same size to the alloy powder sheet, the sheet was stuck to a vertical surface of a metal base material. Thereafter, the temperature of the system was increased to 1,080° C. at a rate of 20° C./min. in a hydrogen gas atmosphere, and after maintaining the system at the temperature, the system was gradually cooled.

Thus, an abrasion resisting alloy layer having a thickness of 0.8 to 0.82 mm, a hardness of 61 to 63 in HRC, and a density of 7.6 to 7.7 g/cm$^3$ and strongly bonded to the steel base material could be formed without causing falling of the alloy powder metal during the sintering treatment.

While the invention has been described in detail and with reference to specific embodiments thereof, it will be apparent to one skilled in the art that various changes and modifications can be made therein without departing from the spirit and scope thereof.

We claim:

1. A process for forming a metal layer from a metal power molding on a metal base material which comprises:

interposing a composition for adhering and fixing the metal powder molding to the metal base material between the metal powder molding and the metal base material by placing a sheet of the composition between the metal power molding and the metal base material or by coating at least one of the metal powder molding and the metal base material with the composition, to thereby form a composite of the metal powder molding, the composition and the metal base material, wherein the composition comprises a thermosetting resin composition containing a mixture of a thermosetting resin and at least one member selected from the group consisting of a metal fine powder, a thermoplastic resin and an adhesive material; and sintering the composite of the metal powder molding, the composition and the metal base material in a non-oxidizing atmosphere until the amount of residual carbon of the composition after completion of sintering is at least about 0.5% by weight and the metal powder molding yields the metal layer on the metal base material, wherein the metal powder molding is formed by rolling a mixture of a metal powder and a synthetic resin-based binder.

2. The process as claimed in claim 1, wherein the thermosetting resin is an epoxy resin.

3. The process as claimed in claim 1, wherein the thermoplastic resin is at least one member selected from the group consisting of a high molecular weight epoxy resin, a polyamide resin, a polyester resin and an ethylene-vinyl acetate copolymer.

4. The process as claimed in claim 1, wherein the adhesive material is an adhesive comprising a (meth)acrylic acid alkyl ester-based polymer.

5. The process of claim 1, wherein said sintering is performed by first heating the composite to a temperature in the range of about 120° to 250° C., whereupon the thermosetting resin in the composition is hardened, whereafter the temperature is elevated to a range wherein the composition is converted to a carbon precursor, whereafter sintering is conducted.

6. The process of claim 1, wherein the metal fine powder has a particle size of 10 $\mu$m or less and is used in an amount of about 0.5 to 100 parts by weight per 100 parts by weight of the thermosetting resin.

7. The process of claim 1, wherein the sheet or coating of the composition has a thickness of about 5 to 50 $\mu$m.

8. The process of claim 1, wherein a sheet of the composition is placed between the metal powder molding and the metal base material.

9. The process of claim 1, wherein at least one of the metal powder molding and the metal base material are coated with the composition.

10. The process of claim 1, wherein the composition comprises the thermosetting resin composition containing a mixture of a thermosetting resin and the metal fine powder.

11. The process of claim 1, wherein the composition comprises the thermosetting resin composition containing a mixture of a thermosetting resin and the thermoplastic resin.

12. The process of claim 1, wherein the composition comprises the thermosetting resin composition containing a mixture of a thermosetting resin and the adhesive material.

* * * * *